United States Patent
Carl et al.

(10) Patent No.: US 11,697,447 B2
(45) Date of Patent: Jul. 11, 2023

(54) STEERING COLUMN POSITIVE LOCK DRIVE MECHANISM

(71) Applicant: NSK LTD., Tokyo (JP)

(72) Inventors: Alex Carl, Ann Arbor, MI (US); Daniel Gazzerro, Ypsilanti, MI (US); David Ray Hartman, Brighton, MI (US); Victor Corona Martinez, Ann Arbor, MI (US)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/614,606

(22) PCT Filed: May 29, 2020

(86) PCT No.: PCT/IB2020/000418
§ 371 (c)(1),
(2) Date: Nov. 29, 2021

(87) PCT Pub. No.: WO2020/240275
PCT Pub. Date: Dec. 3, 2020

(65) Prior Publication Data
US 2022/0227409 A1    Jul. 21, 2022

Related U.S. Application Data

(60) Provisional application No. 62/855,232, filed on May 31, 2019.

(51) Int. Cl.
*B62D 1/184* (2006.01)
*B62D 1/187* (2006.01)

(52) U.S. Cl.
CPC ............. *B62D 1/184* (2013.01); *B62D 1/187* (2013.01)

(58) Field of Classification Search
CPC ................................. B62D 1/184; B62D 1/187
See application file for complete search history.

(56) References Cited

U.S. PATENT DOCUMENTS 6,139,057 A * 10/2000 Olgren ................... B62D 1/184
280/775
8,888,131 B2 * 11/2014 Anspaugh ............. B62D 1/184
280/775

(Continued)

FOREIGN PATENT DOCUMENTS

CN      201240416 Y    5/2009
CN      105711635 A    6/2016
(Continued)

OTHER PUBLICATIONS

International Search Report and Written Opinion dated Sep. 15, 2020, for International Application PCT/IB2020/000418.

(Continued)

*Primary Examiner* — Drew J Brown
(74) *Attorney, Agent, or Firm* — The Dobrusin Law Firm, P.C.

(57) ABSTRACT

A tilt assembly (30) for a steering column assembly (10) including a pair of downwardly disposed plates each having a slot (36); an elongated member adapted to be rotated, wherein the elongated member penetrates the slot (36) of each downwardly disposed plate and extends therebetween; a rotational member (50) located within each slot (36) and having an opening through which the elongated member is received; a biasing member (60) with a first end (62) and a second end (68), where at least one end engages with the rotational member (50). The biasing member (60) is adapted to drive rotation of the rotational member (50). When the tilt assembly (30) is in an unlocked position, the rotational member (50) is adapted to travel with respect to the slot (36), and when the tilt assembly (30) is in a locked position, the (Continued)

rotational member (50) is adapted to rotate and engage with a wail that is fixed with respect to the slot (36). The elongated member, rotational member (50), and biasing member (60) may be configured to eliminate lash. A steering column assembly (10) incorporating the tilt assembly (30) is also contemplated.

19 Claims, 6 Drawing Sheets

(56) References Cited

U.S. PATENT DOCUMENTS

| | | | | |
|---|---|---|---|---|
| 8,978,510 | B2* | 3/2015 | Buzzard | B62D 1/184 74/495 |
| 9,738,304 | B2* | 8/2017 | Kwon | B62D 1/197 |
| 9,764,757 | B2* | 9/2017 | Buzzard | B62D 1/184 |
| 10,717,457 | B2* | 7/2020 | Dubay | B62D 1/19 |
| 2003/0057694 | A1 | 3/2003 | Manwaring et al. | |
| 2006/0090586 | A1 | 5/2006 | Lee | |
| 2011/0185839 | A1 | 8/2011 | Inoue | |
| 2012/0125139 | A1* | 5/2012 | Tinnin | B62D 1/184 74/493 |
| 2014/0000325 | A1 | 1/2014 | Buzzard et al. | |
| 2014/0000405 | A1 | 1/2014 | Anspaugh et al. | |
| 2014/0260763 | A1 | 9/2014 | Buzzard et al. | |

FOREIGN PATENT DOCUMENTS

| | | |
|---|---|---|
| CN | 109789890 A | 5/2019 |
| EP | 2105369 A2 | 9/2009 |
| EP | 3421326 A1 | 1/2019 |
| GB | 2311839 A | 10/1997 |
| WO | 2018/064161 A1 | 4/2018 |

OTHER PUBLICATIONS

Chinese Office Action dated Apr. 26, 2023, for Chinese Application 2020800401706.

Chinese Search Report dated Apr. 20, 2023, for Chinese Application 2020800401706.

* cited by examiner

US 11,697,447 B2

STEERING COLUMN POSITIVE LOCK DRIVE MECHANISM

CLAIM OF PRIORITY

The present application claims the benefit of priority of U.S. Provisional Patent Application No. 62/855,232, filed on May 31, 2019, the contents of which are incorporated herein by reference in the entirety.

FIELD

In general, the present teachings relate to an improved adjustable steering column assembly and methods associated with the same. More particularly, the present teachings are directed to tilt adjustable steering column systems.

BACKGROUND

For many applications, steering column assemblies incorporate one or both of a tilt or telescopic function. For these applications, it is common to employ levers for manual performance of such functions by a vehicle user. By way of example, in what is known as a "manual rake and reach" steering column assembly, the assembly will have both a tilt ("rake") and a telescopic ("reach") function, with a lever provided for a vehicle user to manually release for affording rake and reach adjustment to a selected position, and then to re-engage for fixing the steering column in the selected position.

In current adjustable tilt assemblies, it has become desirable to provide a means of positively locking the column in the tilt up direction to hold the column in tilt position during a secondary impact. This positive locking mechanism may require many parts, which not only complicate assembly but also increase the chances of a part failing or parts being incompatible with each other. In existing assemblies there may be clearance between parts of the assembly. For example, there may be clearance between a spring and a bolt or a lock. This clearance results in free motion between the bolt and the lock, which can result in the failure of the lock to disengage when the actuation mechanism is set to unlock the column.

Notwithstanding efforts to improve adjustable steering column assemblies, there remains a need for alternative assemblies, particularly those having fewer elements, those that reduce or eliminate lash or clearance between parts, or the like.

The following U.S. patent documents may be related to the present teachings: U.S. Patent Application Publication Nos. 2009/0241721 and 2006/0090586; and U.S. Pat. Nos. 8,888,131; 9,162,701; 6,139,057; 8,827,311; and International Publication No. WO 2018/064161, all of which are incorporated by reference herein for all purposes.

SUMMARY

The present teachings make use of a simple, yet elegant, construction approach by which relatively few components can be employed for achieving an adjustable steering column assembly (e.g., for rake and/or reach). For example, though having applicability to externally collapsing assemblies (which are contemplated within the present teachings), the steering column assembly herein may be an internally collapsible assembly.

The present teachings also contemplate a tilt assembly. The tilt assembly may include a pair of downwardly disposed plates, each having a slot. One or more walls defining the slot of the plates may have a toothed surface for engaging with another element of the tilt assembly. The plates may be associated with a bracket structure.

The tilt assembly may include an elongated member that is adapted to be rotated. The elongated member may penetrate the slots of each downwardly disposed plate and extend therebetween. The elongated member may be adapted to be rotated by a user operating device. The user operating device may be a lever. The elongated member may be a tilt bolt. The elongated member (e.g., at its body, as opposed to the head of the bolt) may have a non-circular cross section. The elongated member may have one or more generally flat surfaces extending along a length of the elongated member. The elongated member may have two generally flat surfaces extending along a length of the elongated member. The two generally flat surfaces may be on opposing sides of the elongated member. The elongated member may have an obround or stadium shaped cross section.

The tilt assembly may include a rotational member that is located within one or more of the slots (e.g., within each slot). The rotational member may include an opening through which the elongated member is received. The opening of the rotational member may be defined by one or more curved portions. The opening of the rotational member may be non-circular. The opening may be generally hourglass shaped or shaped like the number 8. The opening of the rotational member may include one or more ridges projecting inwardly into the opening. The opening may include opposing ridges projecting toward each other for contacting opposing sides of the elongated member. The rotational member may include one or more additional openings, such as an opening for engaging with or receiving a portion of the biasing member (e.g., a securing portion of the biasing member). At least a portion of the rotational member may have a toothed surface for engaging with a wall defining the slot. The rotational member may have a wall contact feature for contacting a wall (e.g., an opposing wall) defining the slot. The wall contact feature may contact the wall when the tilt assembly is in the locked position. The wall contact feature may be located on an opposing end of the rotational member from a toothed surface. The rotational member may be generally teardrop or bulb shaped.

The tilt assembly may include a biasing member, such as a spring. The biasing member may have a first end and a second end. At least one end may engage with the rotational member. The biasing member may drive the rotation of the rotational member in the locking direction, the unlocking direction, or both. For example, the biasing member may drive the rotation of the rotational member in both the locking and unlocking direction or only in the locking direction. The first end of the biasing member may contact the elongated member. The first end of the biasing member may engage into the column housing, tilt bracket, or other portion of the assembly. The second end may engage with the rotational member. The biasing member may have one or more generally flat segments adapted to contact one or more generally flat surfaces of the elongated member. The biasing member may have opposing bolt contacting segments which are positioned at opposing generally flat surfaces of the elongated member. The biasing member may be a strip coiled around the elongated member. The biasing member may have a body portion that is coiled around the biasing member one or more times. The biasing member may have a securing portion that extends generally orthogonally from a body portion of the biasing member to engage with the rotational member. The securing portion may be located at the second end of the biasing member. The securing portion may be received within an engagement opening of the rotational member When the tilt assembly is in an unlocked position, the rotational member may be adapted to travel within the slot. When the tilt assembly is in a locked position, the rotational member may be adapted to rotate and engage with a wall defining the slot. Lash may be reduced or eliminated between the elongated member and the biasing member. Lash may be reduced or eliminated between the biasing member and the rotational member. This can be accomplished by preloading the rotational member against the elongated member with the biasing member.

The tilt assembly may further include a bracket for mounting the tilt assembly within a vehicle.

The present teachings also contemplate a steering column assembly having the tilt assembly as described herein. The assembly may further include a column tube, a steering shaft supported for rotation at least in part by the column tube, and a column housing for at least partially carrying the column tube. The assembly may include a manually operated steering wheel adjustment subassembly including a lever for manually actuating the steering wheel adjustment subassembly. The column tube may be configured for telescoping insertion within the column housing. The steering wheel adjustment subassembly may be adapted for selectively adjusting the steering shaft, column tube, or both, in a fore or aft direction generally along the longitudinal axis; selectively raising or lowering the steering shaft, column tube, or both; or a combination thereof.

The present teachings meet the needs of the industry by providing a simplified assembly having few parts, that allow for smooth transition between locking and unlocking, particularly with respect to tilt adjustment. The present teachings also provide an assembly that reduces or eliminates lash between elements of the assembly (e.g., between any combination of the elongated member, the rotational member, the biasing member).

DETAILED DESCRIPTION

Figure 1:
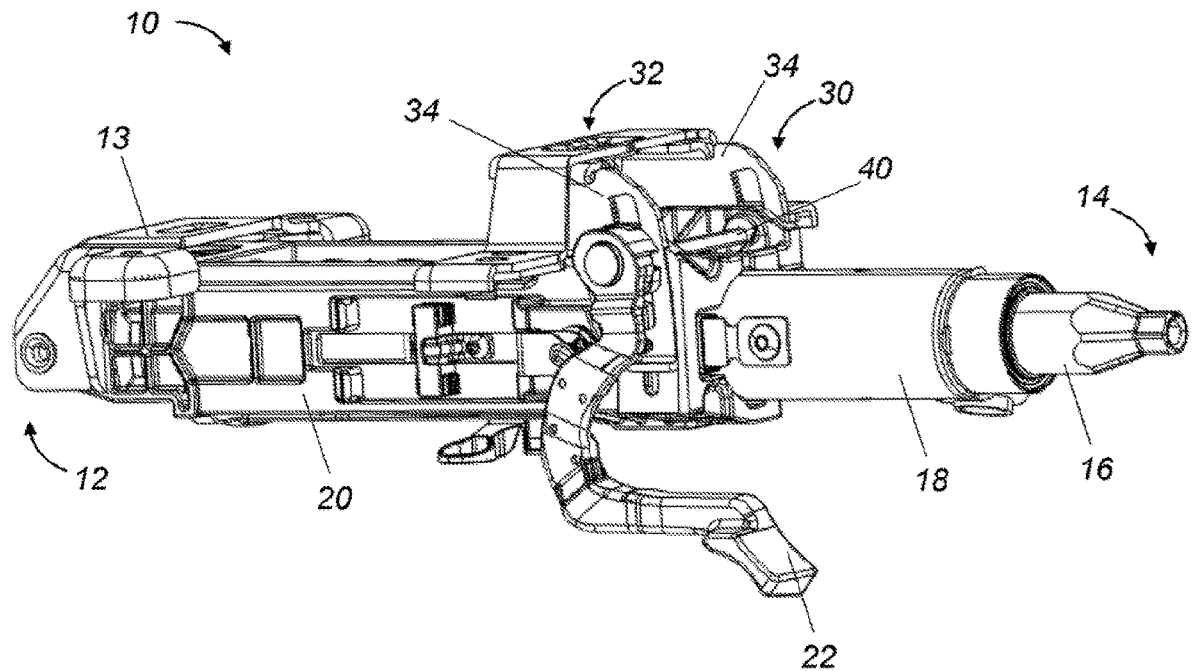
FIG. 1 is a perspective view of an illustrative assembly in accordance with the present teachings.

As required, detailed embodiments of the present teachings are disclosed herein; however, it is to be understood that the disclosed embodiments are merely exemplary of the teachings that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present teachings.

In general, and as will be appreciated from the description that follows, the present teachings pertain to a steering column assembly. The steering column assembly may be a collapsing steering column assembly. The steering column assembly may include a mounting portion for securing the steering column assembly in a vehicle in a fixed operational position. The assembly may have a collapsing portion, at least a portion of which is adapted to travel forward relative to the mounting portion, while the mounting portion stays generally in its fixed operational position (e.g., any travel of the mounting portion is controlled and limited to an amount of about 50 mm or less, about 20 mm or less, or about 10 mm or less). Among its basic concepts the teachings are directed to a steering column assembly that, in the event of an impact such as a secondary impact that results in a load of a certain threshold amount (e.g., a load of about 0.5 kN or more or about 2 kN or more; a load of about 10 kN or less or about 5 kN or less), may be adapted so that at least a portion of the collapsing portion travels forward within the vehicle. The forward travel may be in a telescopic manner. For example, at least one first structure that is operatively connected to a steering wheel (such as a column tube) may advance forward in a vehicle relative to at least one second structure that may at least partially surround the at least one first structure (e.g., a column housing). The forward advancement may be along an axis that is generally parallel with (such as within about 10° of being parallel with) a vehicle longitudinal axis. The column mounting may be at an angle of about 5° or greater, or about 10° or greater relative to a vehicle longitudinal axis. The column mounting may be at an angle of about 35° or less, or about 30° or less relative to a vehicle longitudinal axis.

The teachings envision that the steering column assembly may include a tilt or rake adjustment that is adapted to allow a user to select an angle of inclination of a steering wheel, a reach adjustment that is adapted to allow a user to select an appropriate fore-aft position of the steering wheel, or both. In general, any such adjustment may be controlled by a suitable user operating device (e.g., a lever, an electromechanical actuator, motor, or otherwise). For a manually operated system, a lever or other user operating device may be adapted to control a force applied to maintain the collapsing portion in a user selected position. For example, a lever or other user operating device may be in operative engagement with one, two, or more mechanisms to releasably (and possibly adjustably as well) secure two or more components of the collapsing portion together. Securing may be realized by a suitable securing member (e.g., an elongated force applying member), such as a bolt (e.g., a tilt bolt), rod, strap, bar, band, wedge, cam, or other suitable member, or a combination thereof. For instance, the securing member may be adapted, upon actuation of the user operating device to cause a cam or rotational member to rotate and engage with a wall of a tilt plate to secure the steering wheel at its desired angle. Upon actuation of the user operating device, a pin may be brought out of or pushed into engagement with an opening or toothed portion of a strip located on or attached to a column tube, allowing for telescoping adjustment.

In examples illustrated, teachings describe aspects useful for a steering column assembly for an automotive vehicle. In general, an assembly of the teachings herein may include a steering shaft (e.g., one that can be coupled with a steering wheel or other steering device) and/or a column tube that supports the steering shaft (e.g., via one or more bearings). A column housing may be employed. It may be adapted to telescopically couple with the column tube (e.g., each may have a longitudinal axis that is generally parallel or even coaxial with each other). One or more brackets may be employed for at least partially securing either or both of the column tube or the column housing to the vehicle (e.g., to a cross-vehicle structure). The bracket or one or more tilt plates may include a suitable portion (e.g., a slot such as a generally vertically oriented slot) adapted to provide a guide structure for a tilt function. A user operating device, such as a lever, may be employed for allowing a user to manually operate the assembly. An electromechanical device that applies or releases a force in response to a signal from an operation switch may be employed. The steering column assembly may be configured so that in the event of a threshold load realized during an impact such as a secondary impact, at least a portion the assembly (e.g., the column tube, steering shaft, steering wheel, or a combination thereof) is able to translate forward from its typical operational position. Therefore, the column tube may thus be rendered able to translate forward relative to the column housing, carrying with it the steering wheel attached. As a result, it can be seen that it is possible that the steering wheel is rendered able to translate forward, e.g., away from the user.

The assemblies as described herein generally will include a tube that is operatively connected with a steering wheel (not shown), e.g., via a steering shaft. One such tube, referred to herein as a column tube, typically will have a hollow cavity along at least a portion of (if not the entirety of) the length of the tube and may be sized and configured to receive and support a rotatable shaft, namely a steering shaft and possibly one or more bearings. Both the shaft and the tube will have a longitudinal axis. When installed in a vehicle, the longitudinal axis of each the shaft and the tube (as well as the steering column assembly in general) may be generally coaxially aligned, aligned generally parallel with a longitudinal axis of a vehicle, or each. The shaft and the column tube may be made of or otherwise include a suitable metal, such as one or more of iron (e.g., steel), magnesium, zinc, or aluminum.

The column tube may be generally cylindrical and hollow. It may have a forward end portion and a rearward end portion, and a longitudinal axis. Either or both of the forward or rearward end portion may include a suitable bearing that supports the steering shaft for rotation.

The steering shaft may have a rearward end portion adapted to receive a steering wheel (not shown). It may have a forward end portion that penetrates through and may be supported by a bearing, a key lock collar or both. As noted, the steering shaft may be supported for rotation at least in part by the column tube and have a longitudinal axis that may be generally coaxially aligned with the longitudinal axis of the column tube.

A column housing is pivotally mounted at a pivot mounting location (e.g., a permanently fixed mounting) within the automotive vehicle. The pivot mounting location may be at or within about 20, about 30, about 40 or about 50 mm of a forward end of the column housing. The pivot mounting location may be on an underside of the column housing, on a top side of the column housing, or at some location in between the topside and the underside of the column housing. The column housing at least partially surrounds the column tube. The column housing may have one or more projections or other structure to receive a biasing device (e.g., a spring) that connects the column housing with the tilt bracket. The column housing may be a cast structure (e.g., including a metal such as aluminum, magnesium, zinc, and/or iron (e.g., steel)). During a secondary impact, the column housing may remain in a generally fixed position relative to the pivot mounting location. It may be secured in such a way that it translates forward a relatively small amount (e.g., about 50 mm or less, about 20 mm or less, or about 10 mm or less).

The assembly herein includes a tilt adjustment assembly. The tilt assembly may include one or more tilt plates, an elongated member, a rotational member; a biasing member; or a combination thereof.

The present teachings contemplate a telescope adjustment assembly. Features of the telescope adjustment assembly may also serve to absorb energy during an impact, such as a secondary impact.

The present teachings contemplate one or more bracket structures. The steering column assembly may include a mounting bracket. The steering column assembly may include a tilt bracket. The steering column assembly may include one or more tilt plates.

One or more suitable brackets may be employed. Any such bracket may include a portion for mounting the steering column assembly within a vehicle (e.g., it can be secured to a vehicle structure, such as a cross vehicle beam, instrument panel, or otherwise). The bracket may have a portion that at least partially adjoins the steering shaft support structure (e.g., the column tube, the column housing or both).

The bracket may be an integrated structure so that the tilt portion and the mounting portion are a single structure (e.g., a casting, a stamping, or a combination thereof). The bracket may be made of separate structures that are assembled together to define the mounting and tilt portions in a single structure. The mounting portion may be omitted and/or may be located elsewhere within the steering column assembly. The tilt portion may be omitted. A mounting bracket may be employed separately from a structure defining a tilt portion. Examples of brackets that may be employed, in addition to the examples described herein, include those of United States Publication No. 20100300238 (the entirety of which is incorporated by reference for all purposes; see, e.g., description of bracket 20); U.S. Pat. No. 6,467,807, the entirety of which is incorporated by reference for all purposes (see, e.g., description of brackets 6 and 7 and associated structure).

One or more brackets (e.g., tilt brackets) may be employed and adapted for receiving at least a portion of a steering shaft support structure (e.g., at least a portion of the column tube, the column housing, or both), and/or for mounting the steering column assembly within the automotive vehicle.

A tilt bracket may include an upper portion that is adapted to be secured to a vehicle structure, such as a cross vehicle beam, instrument panel, or otherwise. The bracket may have a structure that at least partially flanks at least a portion of the steering shaft support structure (e.g., the column tube).

The bracket (e.g., tilt bracket) may include a pair of opposing side walls, and an upper wall that is configured to attach to the vehicle (e.g., to a cross vehicle beam, an instrument panel, or other suitable structure). The side walls may project outward relative to the upper wall (e.g., they may be generally orthogonally or obliquely disposed relative to the upper wall). The bracket (e.g., tilt bracket) may have a single downwardly projecting or oriented wall. The bracket (e.g., tilt bracket) may be disposed laterally above and outward relative to an opposing portion of the column housing.

The assembly may have one or more, or a pair of, generally opposing downwardly oriented or projecting walls (e.g., tilt plates). The tilt plates may be integral to or connected to the tilt bracket upper portion. The tilt plates may be separate from the tilt bracket.

One or more of the downwardly oriented or projecting walls (e.g., tilt plates) may include an elongated slot that provides guidance for the tilt function. The slot of the tilt plate may provide a guide path for adjustment, such as by limiting upward and downward travel of the steering column assembly. The elongated slot may be a generally linear slot. The elongated slot may be generally vertically oriented (e.g., generally orthogonal to the longitudinal axis of the vehicle within which the assembly is installed). The elongated slot may be generally at an angle. The elongated slot may have a generally curved shape.

At least a portion of a wall defining the slot may have a surface that is adapted for engaging with another element of the assembly. The walls defining the slot may have a surface that is generally toothed, undulating, textured, or the like. The walls may have one or more surfaces that are smooth. The walls may have one or more surfaces having a complementary shape or texture to a surface of another element of the assembly with which the wall is to engage.

Other elements within the assembly may be adapted to be received within the slot. For example, an elongated member (e.g., a tilt bolt) may be located within a slot. An elongated member may extend between opposing slots of opposing tilt plates. The height adjustment of the assembly may be possible by the tilt bolt moving upwardly or downwardly in the slots when the user operating device, such as a lever, is in an unlocked position. The assembly may be held at the desired angle or height when the user operating device, such as a lever, is moved into the locked position.

A rotational member may be received within the slot. The rotational member may engage with the walls defining the slot. When the rotational member is brought into engagement with the wall defining the slot, the assembly may be in a locked configuration. When the rotational member is rotated out of engagement with the wall, the assembly may be in an unlocked configuration. The rotational member may then be able to travel within the confines of the slot.

The steering wheel adjustment subassembly and/or tilt assembly may include a lever (as discussed, or some other user operating device) adapted for actuating (e.g., manually actuating) the subassembly via tilt, telescoping, or both. One or more motors may be used instead of or in addition to manual actuation via a lever. For example, one or more motors or other electromechanical actuators may cause tilt, telescoping, or both. It is further contemplated that a lever may be used to cause a tilt or telescoping function, while a motor or other electromechanical actuator may be used to cause the other of the tilt or telescoping function. At least one engagement member (e.g., a pin) may be brought into and out of engagement with the column tube or a structure secured thereto for selectively locking the steering shaft into a position (e.g., telescoped position) desired by a user (e.g., via the lever). One or more rotational members may be brought into and out of engagement (e.g., via interference) with a wall of a tilt plate defining a slot for adjustment of the tilt position desired by a user (e.g., via the lever). A mounting structure may detachably mount the steering wheel adjustment subassembly relative to the bracket (e.g., tilt bracket). During an impact such as a secondary impact, the column housing remains in a generally fixed position relative to a forward pivot mounting location (e.g., any forward translation is limited to a relatively small amount (e.g., about 20 mm or less or about 10 mm or less)).

The assembly may further include one or more elongated members adapted to rotate within the assembly. The elongated member may be, for example, a tilt bolt. The elongated member may have a longitudinal axis. The elongated member may be caused to rotate about its longitudinal axis. The elongated member may have a head portion. The elongated member may have a body portion. The diameter of the head portion may be larger than the diameter of the body portion (e.g., when taken at a cross section orthogonal to the longitudinal axis). The body portion of the elongated member may have a cross section having one or more rounded segments. The body portion may have a cross section that is generally circular. The body portion may have a cross section having one or more generally flat segments. The body portion may have a cross section that is non-circular. The body portion may have a cross section that is generally oval shaped. The body portion may have a cross section having a generally polygonal shape. The body portion may have a cross section that is generally stadium shaped or generally obround. The elongated member may have one or more generally flat surfaces extending along at least a portion of the length of the elongated member. The elongated member may have two or more generally flat surfaces extending along at least a portion of the length. The elongated member may have two or more generally opposing flat surfaces on opposing sides of the elongated member.

The elongated member may be driven for rotation about its longitudinal axis by another element of the assembly, such as a user operating device. The user operating device may be a lever.

As the elongated member is rotated about its longitudinal axis, the shape of the cross section of the body portion may allow for contact with another element of the assembly, which may guide or stop further rotation of one or more elements within the assembly. As an example, the elongated member may engage with a portion of the rotational member, biasing member, or both.

The tilt assembly includes one or more rotational members. The rotational member may be driven by another element of the assembly and caused to rotate. The rotational member may act as a lock for the tilt adjustment. The rotational member may have one or more features for engaging with other elements of the assembly. The rotational member may have a shape that allows it to travel within the confines of the area within which it is located while in an unlocked position. The rotational member may have a shape that does not permit further travel when in a locked position. The rotational member may have a shape where the height of the rotational member is greater than its width. If the rotational member is positioned between two walls having a distance therebetween greater than the width of the rotational member and less than the height of the rotational member, as an example, when the rotational member is in an unlocked position, the rotational member is able to travel between the walls. When the rotational member is in a locked position, the rotational member is not able to travel between the walls freely, as it becomes trapped between the walls due to the distance between the walls. The rotational member may have a generally oblong, stadium, or obround shape. The rotational member may have a generally teardrop or bulb shape. The rotational member may have a shape like a capital D or the number 8.

The rotational member may include a surface adapted for contacting another surface of the assembly, such as to lock and unlock the assembly. The surface may engage with another surface within the assembly. The surface of the rotational member may be a toothed, undulating, textured, or complementary surface to the surface with which it is to engage. For example, a toothed surface of the rotational member may engage with a toothed surface defining at least a portion of a slot of the tilt plate.

The rotational member may include a bolt opening. The opening may be located anywhere on the rotational member. The opening may extend though the entire thickness of the rotational member. The opening may be defined by one or more curved portions. The opening may be generally circular, rounded, oval, oblong, or obround, for example. The opening may be generally hourglass shaped or generally shaped like the number 8. The opening may include one or more ridges projecting inwardly into the opening. The opening may include two or more opposing ridges projecting toward each other.

The bolt opening may be adapted to receive a portion of the elongated member. Features defining the opening, such as one or more ridges may engage with the surface of the elongated member. The elongated member may be permitted some rotation within the opening due to the shape of the opening. Some rotation or rotation beyond a certain point or in a certain direction may be inhibited. For example, an opening having two opposing ridges projecting toward each other may act as a rotational stop upon contact between the ridge and a portion (e.g., a generally flat surface) of the elongated member. The contact between the opposing ridges and the elongated member may act as means to move the rotational member into the unlocked position.

The rotational member may have one or more additional openings. The rotational member may include an engagement opening for joining with another element of the assembly. For example, the engagement opening may engage with a portion of the biasing member. The engagement opening may extend through the entire thickness of the rotational member. The engagement opening may extend through only a portion of the thickness of the rotational member. The engagement opening may be of sufficient size to receive a portion of the biasing member (e.g., at least a portion of the securing portion). The engagement opening may have a width that is not so wide that the portion of the biasing member (e.g., at least a portion of the securing portion) does not slip out or become disengaged during operation.

The rotational member may include one or more features for further securing the rotational member in place (e.g., within the slot). The feature may assist to prevent the rotational member from unintentionally rocking, rotating, or unlocking. The rotational member may include a wall contact feature. The wall contact feature may be a bulge, projection, or other feature adapted to contact or engage with a wall (e.g., a wall defining a slot), particularly when the tilt assembly is in a locked position. The wall contact feature may be located on an opposing end or side of the rotational member from the toothed or otherwise textured or locking portion. The wall contact feature may contact the opposing wall defining the slot.

The tilt assembly further includes one or more biasing members. The biasing member may be a coiled or wound strip, wire, or other member. The biasing member, or a portion thereof, may be a generally spiral or coiled shape (e.g., when viewed from the side). The biasing member may have two or more coils that are generally the same size and/or shape. The biasing member may have a gradually widening or tightening curve. The biasing member may be a spring. The biasing member may be a resilient material. The biasing member may have one or more generally flat segments. The biasing member may have one or more generally curved segments. The biasing member may have one or more extensions (e.g., segments extending from a coiled portion). The biasing member may have a first free end and a second free end. The first free end may be located at the innermost part of the spiral or coil. The first free end may extend away from the spiral or coil. The biasing member may coil around itself so that the second free end is an outermost part of the biasing member. The biasing member may coil around an elongated member, where the coils are arranged side-by-side, are generally the same size and/or shape, or both. The second free end may extend from the coiled portion of the biasing member.

A segment of the biasing member may extend between the spiral or coiled portion and the first free end. This segment may be an assembly contact portion (e.g., a column housing contact portion, a tilt bracket contact portion) that may act to contact, bear against, engage with, be received within, or a combination thereof, a portion of the steering column assembly. For example, the segment may be a column housing contact portion that extends away from the coiled portion of the biasing member and engages with the column housing. The segment may be a tilt bracket contact portion that engages with a portion of the tilt bracket. The segment may engage with another feature of the steering column assembly. The segment may extend at an angle or in a direction or have a shape that allows for contact with, insertion into, and/or engagement with a portion of the steering column assembly, such as the column housing. The column housing, tilt bracket, or other portion of the assembly may include a wall, ridge, notch, opening, or other feature where the extending portion of the biasing member is adapted to contact and/or be received. The biasing member may be fixed to a portion of the steering column assembly, such as the column housing or tilt bracket.

A securing portion may be located at the second end. The securing portion may be a tab, projection, key, pin, bent portion (e.g., to be at an angle relative to another portion of the biasing member), or other engagement feature. The securing portion may extend away from the body of the biasing member (e.g., generally orthogonally, generally at an angle from another portion of the biasing member). For example, if the biasing member were uncoiled, the biasing member may be a generally L shape, where the body extends in a longitudinal direction along its length, and the securing portion is a generally transverse or orthogonal portion (e.g., within about 10° of orthogonal). The securing portion may include one or more bends, undulations, curves, angles, or a combination thereof. These features may allow for engagement with or further securing of the securing portion within the rotational member.

The securing portion may be adapted to be at least partially received within an engagement opening of the rotational member. The securing portion may penetrate the engagement opening sufficiently that the biasing member is able to drive rotation of the rotational member.

The biasing member may be adapted to wrap around the elongated member. The biasing member may have one or more surfaces adapted to contact the elongated member. The biasing member may have a coiled shape that generally matches the shape of the outer diameter or cross section of the area of the elongated member around which the biasing member is coiled. The biasing member may wrap around the elongated member one or more times, 1.5 or more times, two or more times, 2.5 or more times, or more.

The biasing member may include a bolt contacting segment. The biasing member may be keyed, joined, secured, coiled around, or the like, to the elongated member. This may be done at the bolt contacting segment. The bolt contacting segment surface may be generally complementary to the surface of the elongated member. For example, if the bolt contacting segment of the biasing member contacts a generally flat portion of the elongated member, the bolt contacting segment may also be generally flat. The biasing member may include two or more bolt contacting segments. The biasing member may have opposing bolt contacting segments positioned at opposing surfaces of the elongated member. For example, the opposing bolt contacting segments may be generally flat and may contact opposing generally flat surfaces of the elongated member. The biasing member may be configured such that it preloads the rotational member against the elongated member in the locking direction. This may thereby reduce or eliminate rotational lash between the biasing member and the rotational member.

The tilt assembly, therefore, may include an elongated member, a biasing member, and a rotational member. The tilt assembly may be free of other rotating components or other drivers. When a user actuates the lever or other user actuating device, the elongated member rotates about its longitudinal axis. The rotation of the elongated member causes the biasing member to also rotate. The rotation of the biasing member, in turn, causes the rotational member to rotate about the longitudinal axis of the elongated member. When rotating the elongated member, the biasing member may act as a linkage, causing the rotational member to rotate. Therefore, the biasing member acts to drive rotation of the rotational member.

To lock the assembly at a desired height or angle relative to the driver, the user operating device, such as a lever, may operate a locking system, such as the tilt assembly. The rotational member may be located within either or both of the vertical slots of the opposing tilt plates in the tilt adjustment assembly. The rotational member, due to its shape (e.g., having a height greater than its width) may engage (e.g., via teeth) with a wall defining the slot of the tilt plate when the lever or other user operating device is in a locked position. The biasing member may be keyed to the elongated member or engaged with a portion of the steering column assembly (e.g., the column housing or a tilt bracket) and attached to the rotational member (e.g., via engagement between the securing portion of the biasing member and the engagement opening of the rotational member) so that when the lever is in a locked position, the spring pushes or rotates the rotational member so the teeth contact the tilt plate (e.g., at a wall defining the slot). Due to the shape of the rotational member, when the lever is in an unlocked position, the rotational member may disengage from the wall defining the slot of the tilt plate (and the teeth may be clear of the surface), and the rotational member and tilt bolt may be permitted to move freely (e.g., upwardly or downwardly) within the slot to adjust the height and angle of the steering wheel for the driver or user.

The elongated member and the rotational member may rotate together. The rotational member may be forced to engage with the elongated member at the ridges, such that the elongated member (e.g., tilt bolt) and rotational member rotate together. The elongated member may be permitted to partially rotate within the opening of the rotational member. However, the rotation may be stopped or reduced upon contact with the ridges of the opening. The ridges may act as a positive engagement mechanism to keep from deforming the biasing member, particularly in the unlocking direction.

A benefit to the present assembly is the biasing of the rotational member against a feature on the elongated member, such that the elements rotate together when there is no force acting on the engagement surface of the rotational member. The mechanism transfers the spring biasing force into the opposing surface of the rotational member when there is force acting on the engagement surface of the rotational member and its opposing engagement surface.

When the rotational member contacts the toothed wall of the slot, the rotational member may stop rotating. However, it is contemplated that the elongated member may continue to rotate due to clearance between the flat on the elongated member and the ridges on the rotational member. This may result in further wind up of the biasing member, creating even greater preload of the rotational member into the toothed wall of the slot.

The assembly as described herein may act to reduce or eliminate lash and/or free motion between the elongated member and biasing member; biasing member and rotational member; or both. The biasing member can preload the rotational member. This preloading or biasing force may push the rotational member so the ridges engage with the elongated member (e.g., at a flat portion of the elongated member). The rotation of the rotational member may then be stopped. The sum of forces and moments on the system may be zero. This may create a situation where the ridges of the rotational member move with the elongated member without lash. The biasing force for causing contact and/or engagement between the ridges and the elongated member may be about 1 N or greater, about 1.5 N or greater, or about 2 N or greater. The biasing force may be about 50 N or less, about 45 N or less, or about 40 N or less. The biasing force on the opposing surface of the rotational member may be about 2 N or greater, about 3 N or greater, or about 4 N or greater. The biasing force on the opposing surface of the rotational member may be about 75 N or less, about 60 N or less, or about 50 N or less.

During an impact (such as a secondary impact), the structures of the present teaching may be configured to include a suitable combination of elements arranged in a manner so that a column tube, steering shaft, or both, is able to translate forward longitudinally relative to the column housing.

The teachings, in general, envision the possible use of one or more energy absorption devices. The energy absorption devices may be a suitable device adapted to deform elastically and/or elastically and plastically. In the course of deforming, the energy absorption devices are thus adapted to absorb energy by way of the deformation. The energy absorption device may be operatively connected or located between or among two or more components. It may be configured so that it limits relative movement as between or among two or more components. The energy absorption devices may be wires, plates, strips, or the like. They may have a constant profile or a varying profile along their length. They may be employed to have one or more fixedly constrained portions (e.g., an end). They may have one or more free ends.

The assembly herein may further employ an energy absorption structure of the type described in Published U.S. Application 2013/0233117, the entirety of which is incorporated by reference herein for all purposes. For instance, the assembly herein may include at least one plastically deformable energy absorption device (e.g., a bend plate, a wire, or some other structure adapted to be carried at least partially by the column housing), wherein the energy absorption device, when employed, absorbs energy by plastic deformation during the secondary impact after the steering shaft support structure (e.g., column tube and steering shaft) starts to translate along the column housing. Any plastically deformable energy absorption device may thus limit the extent of longitudinal travel of the column tube, steering shaft, or both.

The telescope adjustment assembly may include one or more energy absorption plates. The energy absorption plate may function to secure the position of the column tube, steering shaft, steering wheel, or a combination thereof in a desired fore or aft direction. The energy absorption plate may serve to absorb energy, particularly during the forward telescoping of the column tube when a load exerted on the steering wheel exceeds a threshold load (e.g., during a secondary impact). The energy absorption plate may include two or more generally planar sections that are generally parallel to each other and joined at an arcuate portion (e.g., an arcuate portion pointing generally forward). One of the generally planar sections may be fixedly attached to the column tube (e.g., via one or more fasteners such as screws, rivets, or pins; via one or more adhesives; via one or more methods such as soldering or welding; or a combination thereof).

Turning now to the figures, FIG. 1 illustrates a steering column assembly 10 having a forward end 12 and a rearward end 14. A column housing 20 is pivotally attached to the vehicle via a mounting bracket 13 located at the forward end 12, though other configurations and brackets for mounting are also contemplated. The steering column assembly 10 includes a steering shaft 16 at the rearward end 14, which is adapted for supporting a steering wheel (not shown). The steering shaft 16 is supported by a column tube 18, which are both supported by the column housing 20. The column tube 18 is movable relative to the column housing 20, particularly in a fore and aft direction for telescoping adjustment. The steering shaft 16 and the column tube 18 are also adapted to be adjusted upwardly or downwardly relative to a driver via a tilt assembly 30 that includes a tilt bracket 32 including two parallel and downwardly depending tilt plates 34 that support and engage a rotational member, described herein as a tilt bolt 40. Adjustment of the steering shaft 16 and column tube 18 in a tilt and/or telescoping manner may be initiated by operating a lever 22, which disengages adjustment mechanisms or unlocks the mechanisms, allowing a driver to put the steering wheel in a desired position.

Figure 2:
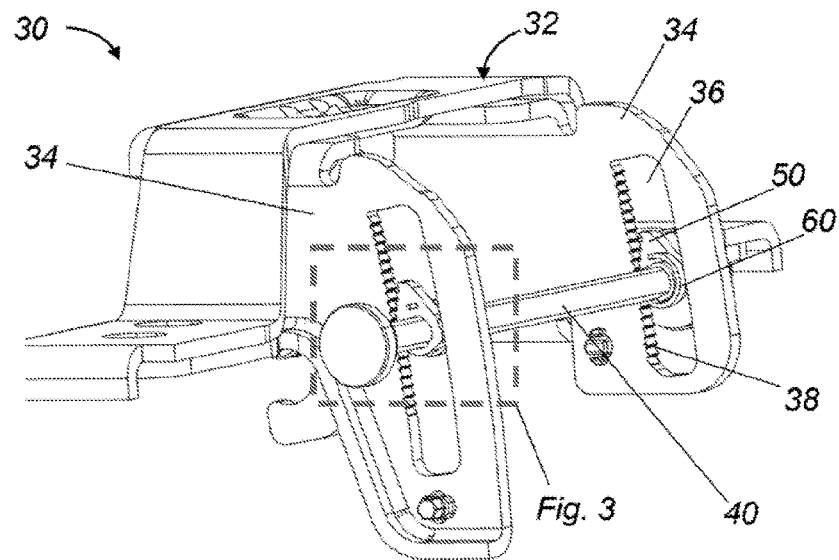
FIG. 2 is a perspective view of components of an illustrative tilt assembly in accordance with the present teachings.

FIG. 2 illustrates components of a tilt assembly 30. For the sake of clarity, the lever 22 (see FIG. 1) has been omitted. The assembly includes a tilt bracket 32 that includes or joins generally opposing tilt plates 34. Each tilt plate 34 includes a slot 36, where a toothed engagement surface 38 defines at least a portion of the slot. The toothed engagement surface 38 is adapted to engage with a rotational member 50 when in a locked position. The rotational member 50 is caused to rotate via a biasing member 60 and actuation of the tilt bolt 40 (e.g., via a lever 22, such as that shown in FIG. 1).

Figure 3:
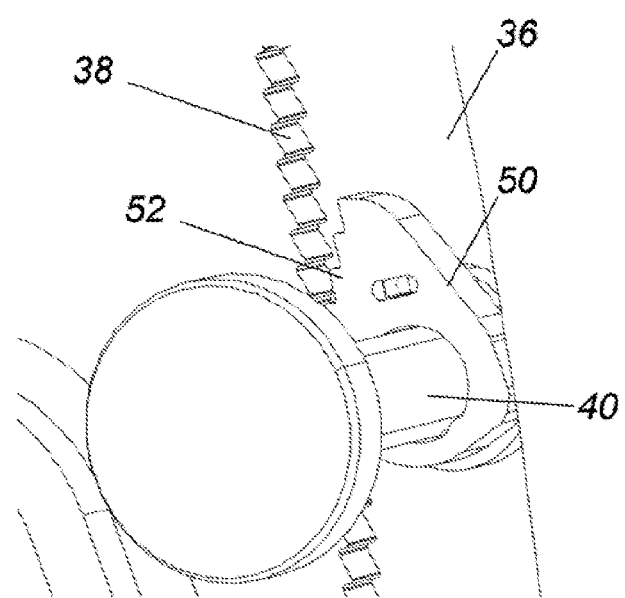
FIG. 3 is an enlarged view of the boxed portion of FIG. 2.

FIG. 3 is an enlarged view of the portion within the dotted box of FIG. 2. The rotational member 50, supported by the tilt bolt 40, is able to travel within the slot 36, and when in a locked position, a toothed surface 52 of the rotational member 50 engages with the toothed engagement surface 38 defining the slot 36, thereby locking the steering column or parts thereof in a desired tilt position.

Figure 4:
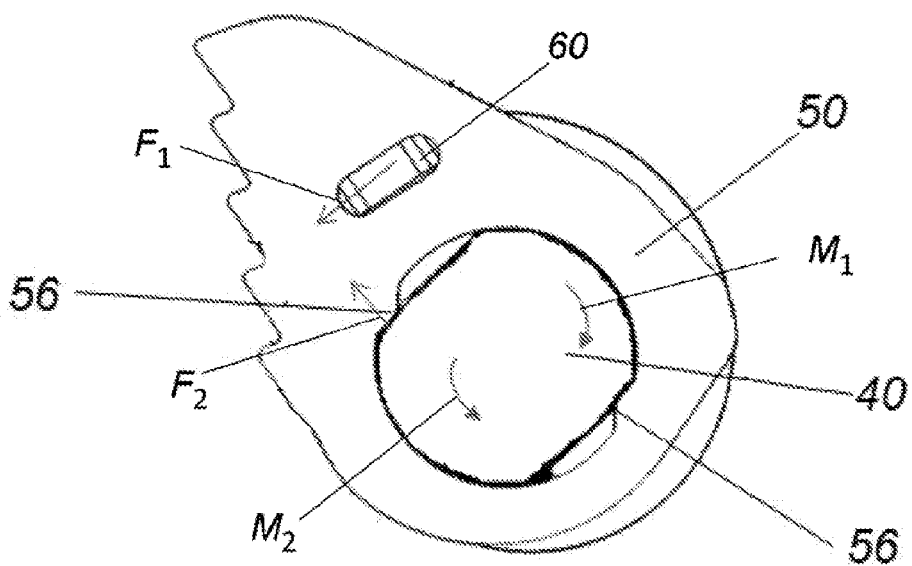
FIG. 4 is an illustration of preloading the rotational member and reducing lash.
Figure 5:
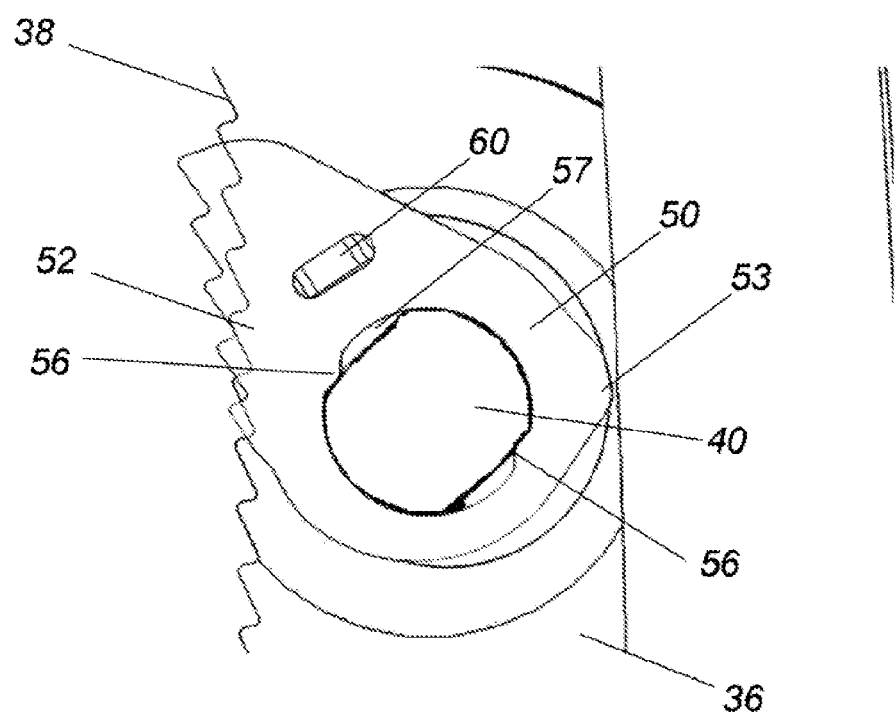
FIG. 5 is an illustrative tilt assembly in a locked position.

FIG. 4 illustrates the forces acting between members of the assembly when the pieces are not engaging with a surface defining the slot 36 (see FIG. 5). The biasing member 60 is shown to preload the rotational member 50 through force arrow $F_1$. This force $F_1$ will push the rotational member 50 to cause contact between the ridges 56 and the elongated member or tilt bolt 40. The rotation of the rotational member 50 is stopped by the reaction force $F_2$. The biasing member 60 being keyed to the elongated member or tilt bolt 40 generates a reaction torque $M_1$. The ridge 56 interacting with the flat of the elongated member or tilt bolt 40 generates a reaction torque $M_2$. The sum of the forces and moments on the system is zero. This creates a situation where the ridge 56 will move with the flat on the elongated member or tilt bolt 40 without lash.

FIG. 5 is a side view of an assembly in a locked position. A toothed surface 52 of the rotational member 50 engages with the toothed engagement surface 38 defining the slot 36. When the rotational member 50 contacts the toothed engagement surface 38, the rotational member will stop rotating. Surfaces of the tilt bolt 40 rest against ridges 56 of the rotational member 50 so that when the rotational member rotates to be in the unlocked position, the contact between the tilt bolt and the ridges reduce or eliminate binding of the biasing member, thereby acting as a positive engagement mechanism to keep from deforming the biasing member. However, the tilt bolt 40 may still be permitted to rotate due to the clearance 57 between the flat of the tilt bolt 40 and the ridges 56. This may result in further wind up of the biasing member 60, creating an even greater preload of the rotational member 50 into the toothed engagement surface 38 defining the slot 36. On the opposing end of the rotational member 50 is a wall contact feature 53, that contacts the opposing wall defining the slot 36 (e.g., while in a locked position). The wall contact feature 53 assists in keeping the rotational member 50 in place within the slot.

Figure 6:
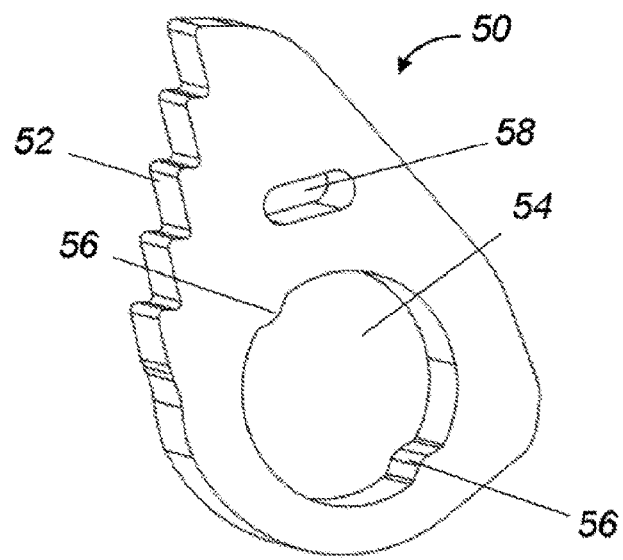
FIG. 6 is an exemplary rotational member in accordance with the present teachings.

FIG. 6 is an exemplary rotational member 50, which includes a toothed surface 52 for engaging with a toothed engagement surface 38, such as that shown in FIGS. 3 and 5. A bolt opening 54 through the rotational member 50 allows for a tilt bolt 40 (see FIGS. 3 and 5) to be received therethrough. The walls defining the bolt opening 54 include one or more ridges 56, which act as a positive engagement mechanism to keep from deforming the biasing member and/or to act as a stop. The rotational member 50 also includes a spring engagement opening 58, which receives a portion of the biasing member 60 (see FIGS. 9A and 9B), thereby allowing the rotational member to rotate into a locked and unlocked position.

Figure 7:
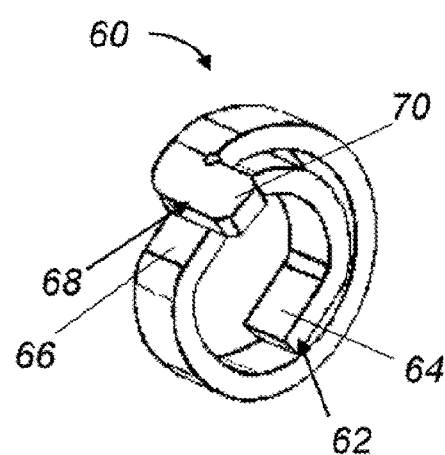
FIG. 7 is an exemplary biasing member in accordance with the present teachings.

FIG. 7 is an exemplary biasing member 60. The biasing member includes a first end 62 around which the biasing member is coiled. At or near the first end is a bolt contacting segment 64, which has generally the same shape or surface as the surface of the tilt bolt that it contacts. For example, the bolt contacting segment 64 is generally flat to contact a generally flat portion 42 of the tilt bolt 40 (see FIG. 8C). An opposing bolt contacting segment 66 is located opposite the bolt contacting segment 64, which further secures the biasing member 60 on a tilt bolt 40 to reduce or remove any clearance or lash between the tilt bolt and the biasing member. The opposing bolt contacting segment 66 may have a complementary shape to the surface of the tilt bolt it contacts. For example, as shown, the opposing bolt contacting segment 66 is generally flat. The biasing member may be secured to the tilt bolt at one or more of the bolt contacting segments. The biasing member 60 includes a second end 68. Also shown is a securing portion 70 located at the second end 68. The securing portion 70 is adapted to engage with the spring engagement opening 58 of the rotational member 50 of FIG. 6. The securing portion 70 may extend generally orthogonally from the body of the biasing member 60 so as to contact and engage with the rotational member.

Figure 8A:
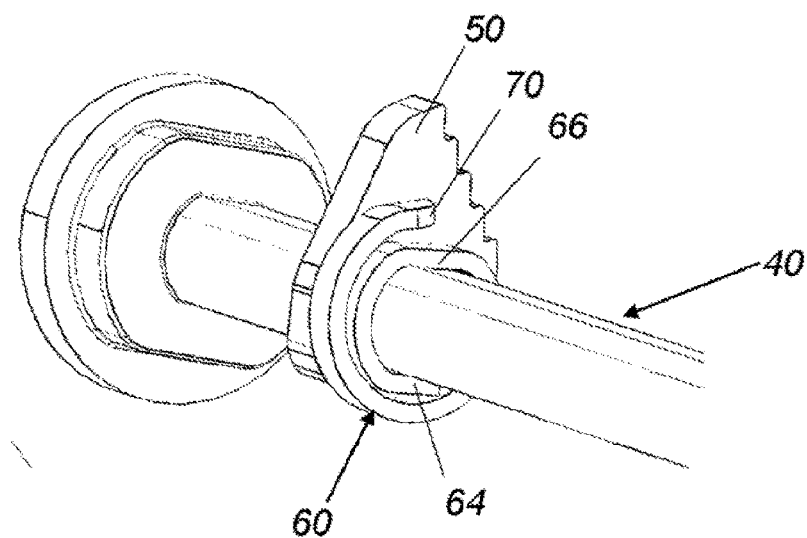
FIGS. 8A, 8B, and 8C are views of a tilt bolt, rotational member, and biasing member in accordance with the present teachings.
Figure 8B:
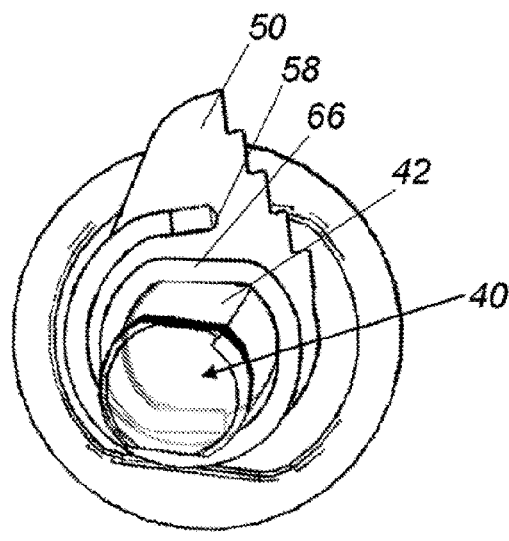
Figure 8C:
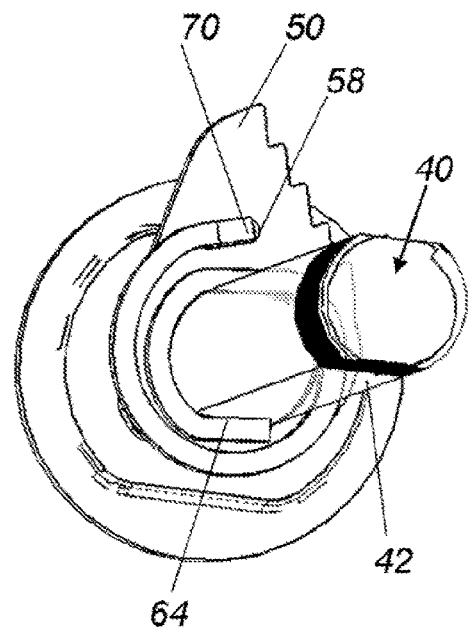

FIGS. 8A, 8B, and 8C are different views of a rotational member 50 and biasing member 60 assembled on a tilt bolt 40. The tilt bolt 40 shown has two generally flat portions 42, though other shapes or surfaces are contemplated. The generally flat portions contact the bolt contacting segment 64 and opposing bolt contacting segment 66 of the biasing member 60. The biasing member 60 engages with the rotational member 50 via the securing portion 70 being received within the spring engagement opening 58. The assembly reduces or removes clearance or lash between the tilt bolt 40 and the biasing member 60 and between the biasing member 60 and the rotational member 50.

Figure 9A:
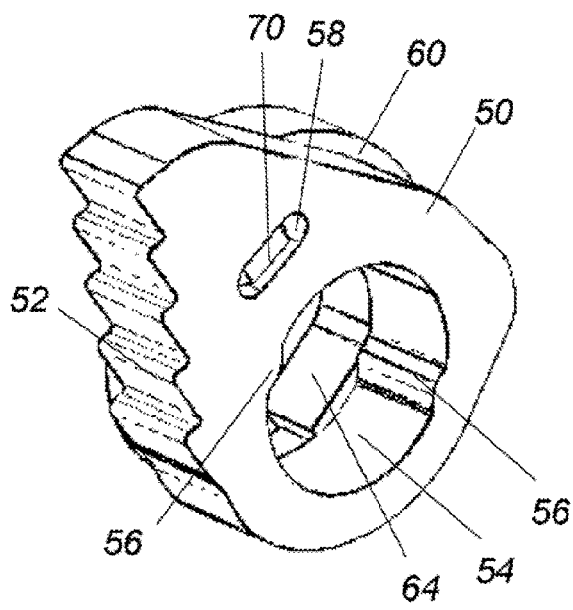
FIGS. 9A and 9B are views of a rotational ember and biasing member in accordance with the present teachings.
Figure 9B:
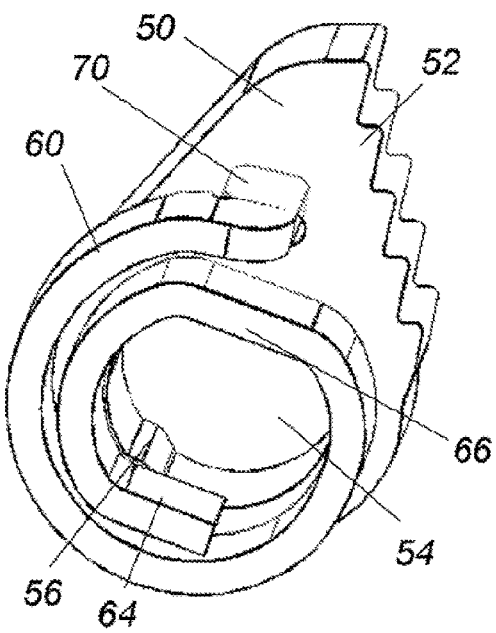

FIGS. 9A and 9B illustrate the engagement between the rotational member 50 and the biasing member 60. The bolt opening 54 is generally aligned with the interior of the coil of the biasing member 60, where the tilt bolt is received. The securing portion 70 of the biasing member 60 is received within the spring engagement opening 58 of the rotational member 50, thereby causing or allowing for rotation of the rotational member 50 or forcing the toothed surface 52 to engage with a portion of the steering column assembly (e.g., a toothed engagement surface defining a slot of a tilt plate) to put the assembly in a locked position. Ridges 56 of the rotational member 50 and the bolt contacting segment 64 or opposing bolt contacting segment 66 of the biasing member 60 are located such that the rotational member 50 is preloaded against the edge of the tilt bolt, thereby eliminating lash when assembled.

Figure 10:
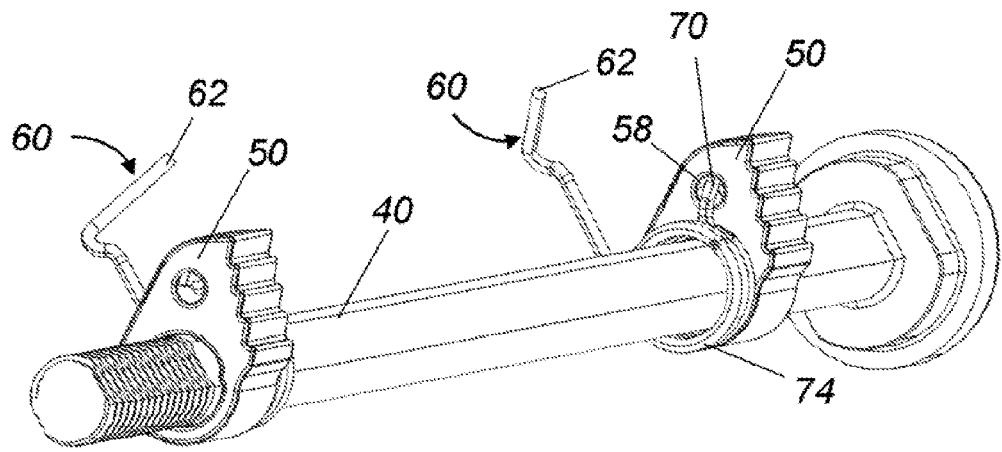
FIG. 10 is a view of a tilt bolt, rotational members, and biasing members in accordance with the present teachings.

FIG. 10 illustrates an exemplary assembly with opposing rotational members 50 situated on an elongated member or tilt bolt 40. The assembly includes biasing members 60 coiled around the elongated member or tilt bolt 40. A securing portion 70 of the biasing member 60 is received within a spring engagement opening 58 of the rotational member 50 at one end. An opposing end of the biasing member 60 (the first end 62) extends away from a coiled portion 74 of the biasing member 60.

Figure 11:
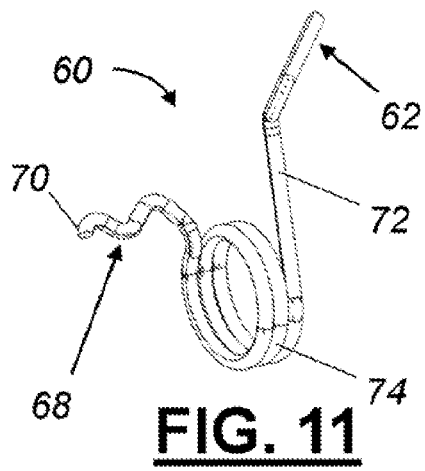
FIG. 11 is an exemplary biasing member in accordance with the present teachings.

FIG. 11 illustrates an exemplary biasing member 60, such as one shown in FIG. 10. The biasing member 60 includes a first end 62, which extends away from a coiled portion 74 of the biasing member 60. An assembly contact portion 72 is located between the coiled portion 74 and the first end 62. The assembly contact portion 72 is adapted to contact another portion of the assembly (see FIG. 12). The biasing member includes a second end 68 extending from the coiled portion 74. A securing portion 70 is located at or near the second end 68 for engaging with a rotational member (e.g., being received within a spring engagement opening 58; see FIG. 10).

Figure 12:
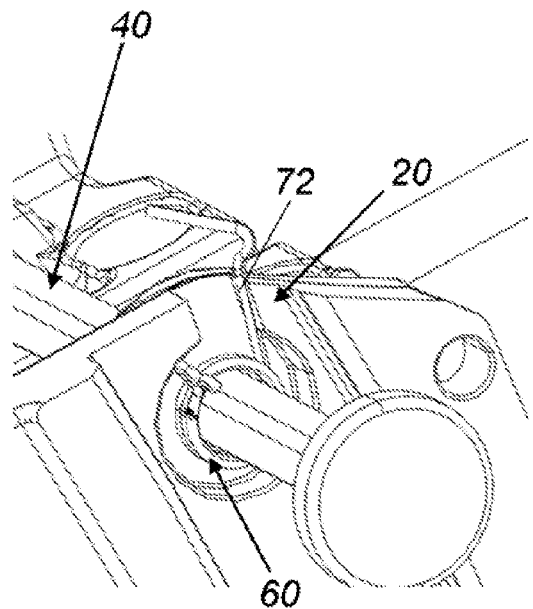
FIG. 12 is a portion of an illustrative assembly including a biasing member engaging with a column housing.

FIG. 12 illustrates an exemplary assembly including an elongated member or tilt bolt 40 extending between portions of a column housing 20. A biasing member 60 is coiled around the tilt bolt 40. For clarity, the rotational member has been omitted. The biasing member 60 includes an assembly contact portion 72 that contacts, engages with, or is received within a portion of the column housing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As can be appreciated, variations in the above teachings may be employed. For example, it is possible that other surfaces other than toothed surfaces may engage to lock the elements in place. Other frictional surfaces or complementary shapes between the rotational member and the wall defining the slot are contemplated. The slots may be incorporated into another portion of the steering column, such as the column housing. The drive mechanism for the rotational member or lock may be something other than a bolt or elongated member, such as some other type of axle pivot. The biasing member may be something other than a spring. The biasing member may react against another structure of the steering column other than the bolt, such as the column housing, column tube, or tilt bracket, for example. The biasing member may bias the rotational member into some other alignment feature not on the axle pivot member itself. Additional biasing features or compliance features between the axle pivot and the biasing member may remove clearance between elements. The additional biasing feature or compliance feature may be integrated into other parts of the assembly, such as the first spring.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of about or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described. Further, geometries shown in the drawings (though not intended to be limiting) are also within the scope of the teachings, even if not verbally described.

What is claimed is:

1. A tilt assembly for a steering column assembly comprising:
   a. a pair of downwardly disposed plates each having a slot;
   b. an elongated member adapted to be rotated, wherein the elongated member penetrates the slot of each downwardly disposed plate and extends therebetween;
   c. a rotational member located within each slot and having an opening through which the elongated member is received;
   d. a biasing member with a first end and a second end, wherein the first end of the biasing member is adapted to engage into a column housing, a tilt bracket, or with the elongated member of the tilt assembly, wherein the second end is received within an engagement opening of the rotational member and engages with the rotational member, and wherein the biasing member drives rotation of the rotational member in a direction to engage with a fixed wall and the rotational member is configured to impede the rotation of the rotational member by the biasing member so as to reduce or eliminate lash between the rotational member and the elongated member;
      wherein when the tilt assembly is moved to an unlocked position, the rotational member is driven by the elongated member to disengage from the fixed wall and the rotational member is adapted to travel with respect to the slot;
      wherein when the tilt assembly is in a locked position, the rotational member is adapted to rotate and engage with a wall that is fixed with respect to the slot; and
      wherein lash is reduced or eliminated between the biasing member and the rotational member by preloading the rotational member into the elongated member with the biasing member.

2. The tilt assembly of claim 1, wherein one or more walls defining the slot of the plates has a toothed surface for engaging with another element of the tilt assembly.

3. The tilt assembly of claim 1, wherein the opening of the rotational member includes ridges defined by one or more curved portions.

4. The tilt assembly of claim 1, wherein the opening of the rotational member is generally hourglass shaped or generally shaped like a number 8.

5. The tilt assembly of claim 1, wherein the opening of the rotational member includes one or more ridges projecting inwardly into the opening for reducing lash between the elongated member and the rotational member.

6. The tilt assembly of claim 1, wherein the opening of the rotational member includes opposing ridges projecting toward each other for contacting opposing sides of the elongated member.

7. The tilt assembly of claim 1, wherein at least a portion of the rotational member has a toothed surface for engaging with a wall defining the slot.

8. The tilt assembly of claim 1, wherein the rotational member has a wall contact feature for contacting a wall defining the slot.

9. The tilt assembly of claim 8, wherein the wall contact feature contacts the wall when the tilt assembly is in the locked position.

10. The tilt assembly of claim 8, wherein the wall contact feature is located on an opposing end of the rotational member from a toothed surface.

11. The tilt assembly of claim 1, wherein the rotational member is generally teardrop or bulb shaped.

12. The tilt assembly of claim 1, wherein the elongated member is adapted to be rotated by a lever.

13. The tilt assembly of claim 1, wherein the elongated member has a non-circular cross section.

14. The tilt assembly of claim 13, wherein the elongated member has one or more generally flat surfaces extending along a length of the elongated member.

15. The tilt assembly of claim 1, wherein the biasing member has a feature adapted to interact with the column housing to preload the rotational member into the elongated member.

16. The tilt assembly of claim 1, wherein the biasing member has a body portion that is coiled around the biasing member one or more times.

17. The tilt assembly of claim 1, wherein the biasing member has a securing portion at the second end that extends generally orthogonally from a body portion of the biasing member and is received within the engagement opening to engage with the rotational member.

18. A steering column assembly comprising:
   a. a column tube;
   b. a steering shaft that is supported for rotation at least in part by the column tube;
   c. a column housing for at least partially carrying the column tube, wherein the column tube is configured for telescoping insertion within the column housing;
   d. a manually operated steering wheel adjustment subassembly including a lever for manually actuating the steering wheel adjustment subassembly; and
   e. the tilt assembly of claim 1.

19. The steering column assembly of claim 18, wherein the steering wheel adjustment subassembly is adapted for:
   a. selectively adjusting the steering shaft, column tube, or both, in a fore or aft direction generally along the longitudinal axis;
   b. selectively raising or lowering the steering shaft, column tube, or both; or
   c. both a. and b.

* * * * *